United States Patent [19]
Kozawa

[11] 3,893,870
[45] July 8, 1975

[54] HYDROGEN ABSORBING MATERIAL FOR ELECTROCHEMICAL CELLS

[75] Inventor: Akiya Kozawa, Middleburg Heights, Ohio

[73] Assignee: Union Carbide Corporation, New York, N.Y.

[22] Filed: June 14, 1973

[21] Appl. No.: 369,866

Related U.S. Application Data

[60] Division of Ser. No. 268,785, July 3, 1972, which is a continuation of Ser. No. 853,311, Aug. 27, 1967, abandoned.

[52] U.S. Cl................................ 136/107; 136/179
[51] Int. Cl. ............................................. H01m 1/08
[58] Field of Search............ 136/179, 3, 6 GC, 107, 136/83, 13–14, 24, 28, 29; 55/74, 387; 252/471, 472

[56] References Cited
UNITED STATES PATENTS

| | | | |
|---|---|---|---|
| ,288,722 | 12/1918 | Snelling | 136/138 |
| 2,693,499 | 11/1954 | Neumann | 136/177 |
| 2,951,106 | 8/1960 | Ruetschi | 136/6 GC |
| 3,261,714 | 7/1966 | Kordesch et al. | 136/6 GC |

*Primary Examiner*—Anthony Skapars
*Attorney, Agent, or Firm*—C. F. O'Brien

[57] ABSTRACT

Buildup of unreacted hydrogen gas in sealed electrochemical cells has been prevented by inserting a hydrogen absorbing device into the cell before sealing. This hydrogen absorbing device is preferably a discrete shaped body, e.g., cylindrical or ring shaped, encased in an electrolyte impermeable, but hydrogen gas permeable membrane and includes a material which will react chemically with hydrogen gas, a catalyst for the hydrogen consuming reaction, and a compatible binder which maintains the reactant and catalyst in the form of a discrete shaped body which is porous to hydrogen gas.

3 Claims, 2 Drawing Figures

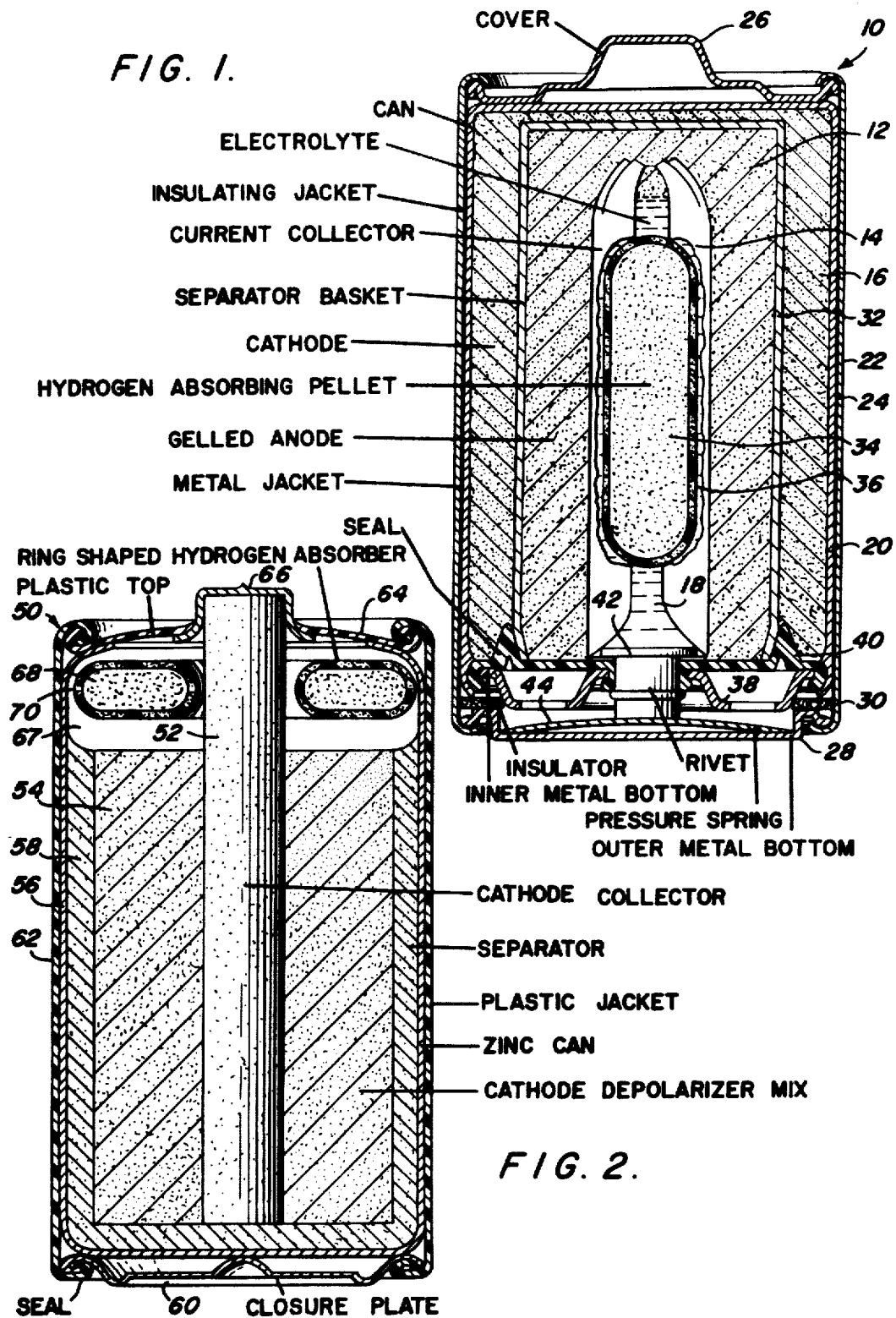

3,893,870

HYDROGEN ABSORBING MATERIAL FOR ELECTROCHEMICAL CELLS

This is a division of application Ser. No. 268,785 filed July 3, 1972 which in turn is a continuation of application Ser. No. 853,311 filed August 27, 1967 and now abandoned.

BACKGROUND OF THE INVENTION

This invention relates to electrochemical cells and more particularly is concerned with the prevention of hydrogen gas pressure buildup in sealed galvanic cells.

It has long been an object of the battery industry to produce sealed cells in which the buildup of excessive gas pressure is avoided. This goal has been partially achieved in nickel-cadmium cells through the operation of such cells on the oxygen overcharge principle. The electrodes employed in this system are so designed that only oxygen is evolved on overcharge. The oxygen thus produced oxidizes the metal anode, thereby effectively preventing excessive gas pressure within the cell.

While the oxygen overcharge system is advantageous in that it makes possible a sealed battery, there are several inherent problems which limit its applications. For example, the anode must be made of a material which reacts rapidly with oxygen and the cathode material is limited to compounds which do not deteriorate on repeated overcharging and which do not form soluble materials on overcharge. In addition, the applications of this system are limited to rechargeable cell systems employing expensive components and there is no efficient way of recombining the hydrogen gas generated by corrosion in the normal course of battery use.

It has been proposed, to remove the hydrogen gas evolved during cell discharge, to utilize the reaction of hydrogen and oxygen to form water. In some battery systems, for example, a third electrode has been inserted to combine the hydrogen and oxygen produced during discharge. In the lead-acid battery system, palladium or platinum metal has been used to catalyze the reaction of hydrogen and oxygen to form water. Neither of these solutions has been completely satisfactory since the amounts of hydrogen and oxygen gas formed are not necessarily the stoichiometric amounts which will react to form water without leaving unreacted gas in the system. If there is unreacted hydrogen gas in the system, the internal pressure in sealed cells may increase to dangerously high levels or may lead to seal rupture.

SUMMARY OF THE INVENTION

According to the present invention there is provided a method and device which will prevent buildup of unreacted hydrogen gas in sealed cells. More particularly there is provided a hydrogen gas absorbing device comprising a discrete shaped body containing a material which will react chemically with hydrogen gas, a catalyst for the hydrogen gas consuming reaction and a binder which is compatible with the other materials and will maintain them in a shaped body which is permeable to hydrogen gas. The shaped body is preferably packaged in a material which is permeable to hydrogen gas but impermeable to the cell electrolyte throughout the life of the cell.

BRIEF DESCRIPTION OF THE DRAWINGS

FIG. 1 is a stylized cross-sectional view of a commercial manganese dioxide-zinc alkaline battery but containing, in addition to conventional components, a hydrogen absorbing device in accordance with the present invention; and FIG. 2 is a stylized cross-sectional view of a carbon-zinc LeClanche battery containing a ring-shaped hydrogen absorbing device in accordance with the present invention.

Referring to the drawings in more detail, there is shown in FIG. 1 a manganese dioxide-zinc alkaline battery generally designated 10 having a gelled anode 12 of powdered zinc, a semi-rigid tubular current collector 14 of brass, a manganese dioxide cathode 16, and an alkaline potassium hydroxide electrolyte 18 contained within the current collector 14 and throughout the gelled anode 12.

The inner components of the cell are enclosed in a cupped metallic can 20 surrounded by a metal jacket 22 which is electrically insulated from the can by an insulating jacket 24. The extremities of the insulating jacket 24 and the metal jacket 22 are crimped around the outer edges of a top metal cover 26 and an outer bottom metal cover 28. An insulator 30 electrically insulates the can 20 from the outer bottom metal cover 28. The cathode is snugly fitted within can 20 and is lined with a separator basket 32 of a non-woven fabric of regenerated cellulose and vinyl chloride. The current collector 14, the electrolyte 18 and the gelled anode 12 are separated from the top of can 20 (which may have a thin layer of cathode mix thereon) by the top of the separator basket 32. A hydrogen absorbing pellet, generally designated 34, is positioned within the hollow core of current collector 14 and comprises a mixture of a compound which will react with hydrogen gas, a catalyst for this hydrogen consuming reaction and a suitable porous binder holding the reactant and catalyst in the desired shape. The pellet is generally cylindrical in shape and is coated with a layer of hydrogen gas permeable but electrolyte impermeable film 36 which protects the pellet from chemical attack by the electrolyte. The composition and method of fabricating the pellet will be described in greater detail hereinafter.

Suitably, the cell closure for this cell is of the type disclosed and claimed in U.S. Pat. No. 3,042,734. Such a closure comprises an inner metal bottom 38 secured to the cathode 16 by means of seal 40. A rivet provides a tight mechanical connection between current collector 14 and inner metal bottom 38 but is electrically insulated from the inner metal bottom by seal 40. A pressure spring 44 is provided in electrical contact with rivet 42 and outer metal bottom 28 to establish and maintain contact between current collector 14 and outer metal bottom 28.

During the cell reaction, any hydrogen gas which may be generated will diffuse through the gelled anode and electrolyte and will contact the hydrogen absorbing pellet. The gas will penetrate the membrane covering the pellet, contact the reactant in the presence of the catalyst and react chemically to form a solid product.

In commercially available manganese dioxide-zinc alkaline battery systems, the gelled anode is usually amalgamated powdered zinc held together with gelled electrolyte in which the gelling agent is a material such as sodium carboxymethyl cellulose. A substantial amount of mercury is included to reduce the wasteful zinc corrosion and thereby prevent hydrogen gas evolution. By including the hydrogen absorbing device of the present invention in alkaline batteries, a sealed battery can be produced in which the amount of mercury present in the cell can be reduced since the hydrogen gas formed during the cell reaction will be removed by the hydrogen absorbing device. This improvement results in a battery which is completely sealed and costs less to manufacture than manganese dioxide-zinc alkaline batteries presently commercially available.

FIG. 2 shows an embodiment of the invention wherein a LeClanche round cell is adapted to make efficient use of a hydrogen absorbing device in accordance with the present invention. The round cell, generally designated 50, employs the usual carbon rod cathode collector 52 and manganese dioxide-carbon cathode depolarizer mix 54 separated from a zinc can 56 by a separator 58. A metal closure plate 60, for example a lead-plated steel member, is provided in electrical contact with the bottom of the zinc can to avoid leakage if the zinc is perforated during discharge. The zinc can 56 is encased in a standard plastic jacket 62 which is sealed to contact plate 60 at the bottom of the cell and to a plastic top 64 at the top of the cell. These seals can be made air tight and thereby provide a cell system which is completely sealed and leak-proof. The carbon rod cathode collector 52 extends through the plastic top 64 and is capped with a metal cover 66 which acts as the positive terminal for the cell. The depolarizer mix 54 is formed in a manner such that an air space 67 is left between the top of the depolarizer and the plastic top 64. A hydrogen absorbing device 68 coated with a plastic film 70 is positioned above the cathode depolarizer mix 54 and acts, in the same manner as the pellet of FIG. 1, to absorb any hydrogen gas which is liberated during the shelf life or discharge of the battery. In this embodiment, however, the hydrogen gas absorbing device is ring-shaped to conform to the available air space 67 above the cathode depolarizer mix 54.

The hydrogen gas evolved during the shelf life of a cell can be easily absorbed by the ring-shaped absorber. However, under abuse conditions, such as a continuous electrical short circuit between the anode and the cathode, hydrogen gas will be generated on the carbon surface in the cathode mix as long as unused zinc remains. In order to avoid this situation, the amount of zinc should preferably be limited to much less than the cathode capacity. This accounts for the possibility of perforation of the zinc can at the bottom of the cell and necessities the inclusion of the closure plate 60.

It can be seen from the foregoing discussion that the hydrogen absorbing device of the present invention is adaptable to various shapes and sizes of cell structures and is useful in a wide variety of battery constructions where hydrogen gas evolution is a problem. The hydrogen absorbing device can be included in individual cells, in a sealed package containing a series of cells, or in any closed container where hydrogen gas absorption is desirable.

Hydrogen absorbing devices in accordance with the present invention have three essential components: a substance which will react with hydrogen gas, a catalyst for the hydrogen oxidation reaction, and a binder which will maintain the reactant and catalyst as an integral unit. Preferably, the device will also have an external coating to prevent contamination of the reactant and catalyst by cell components or by-products of the cell reaction.

The material which will react with the hydrogen gas can be any solid compound which will react with or oxidize hydrogen to yield a solid or liquid reaction product. Specifically, suitable materials are those which, at ordinary ambient temperature, will exhibit a negative free energy change ($\Delta F$) associated with the reaction of that material with hydrogen. Preferred reactants include manganese oxides such as manganese dioxide ($MnO_2$), manganic oxide ($Mn_2O_3$), manganese hydroxide (MnOOH) and hausmannite ($Mn_3O_4$), cupric oxide, silver oxide, mercuric oxide, manganese phosphate, bismuth trioxide, m-dinitrobenzene and quinone. Of these, manganese dioxide is particularly preferred since it is a relatively inexpensive and readily available material, and its properties and predictability in battery systems are well established.

A catalyst for the hydrogen consuming reaction is necessary since, while each of the above compounds will react spontaneously with hydrogen, the reaction will not take place at ordinary ambient temperature at a rate sufficient to insure that hydrogen gas will be absorbed from the system before the internal pressure causes rupture of the battery seal. The need for a catalyst is dramatized by the fact that, although the vast majority of batteries presently produced contain large amounts of manganese dioxide, the buildup of unreacted hydrogen gas is still the major problem in obtaining completely sealed batteries. The preferred catalysts include the so-called "noble metals" or the platinum family of metals which make up Group VIII of the Periodic Table. Suitable noble metals which may be used in the practice of this invention are palladium, platinum and rhodium. Of these, palladium is preferred since it has a natural tendency itself to absorb and hold hydrogen gas on its surface and would act to retain the gas in the vicinity of the reactant until the reaction between the gas and the reactant can take place. Particularly preferred is a material known as palladium catalyzed carbon which contains about 5 per cent palladium metal on a substrate of carbon particles. In addition to the noble metals themselves, compounds of Group VIII metals may also be used. Illustrative of such compounds are nickel boride and Raney nickel.

The binder for the system should be one which will retain the reactant and catalyst in the desired geometric shape which will be porous to hydrogen gas to allow the gas to circulate through the pellet and contact the surface of the reactant and catalyst. The binder can be organic or inorganic material and need only possess the desired physical properties. Powdered synthetic organic polymers, e.g., polyethylene, and natural condensation polymers, e.g., starch, are suitable for use as binders in the devices of the present invention. A preferred binder is an inorganic cement such as Portland cement. This binder is preferred since the cement provides sufficient strength and porosity and yet does not contaminate or poison the metal catalyst. Acetylene black can be added to improve the conductivity of the pellet and to provide the device with the maximum number of hydrogen gas permeable channels to enable the gas to penetrate to the interior of the device and make efficient use of the reactant and catalyst contained therein. In addition, the use of acetylene black and other electrochemically inactive components, e.g., steel wool fibers, in the binder increases the strength of the device and permits a substantial reduction in the amount of catalyst necessary to allow the reaction to proceed at a desirable rate. Other physical properties of the device, e.g., specific gravity, can also be altered by proper selection of additives and use of the proper amounts thereof. For example, the conductive material (carbon) can be selected to have a specific gravity such that the pellet will float in the cell electrolyte and thus be automatically situated at the juction between the electrolyte and the air space in the cell where hydrogen formed can accumulate. A low density carbon or graphite powder is an example of such a material which can be conveniently used to prepare a floating pellet.

The hydrogen absorbing device of the present invention can be fabricated in several ways, depending upon the binder which is employed. When the binder is cement, it is merely necessary to mix the powdered reactant, catalyst and inactive fillers, if any, with the wet cement and mold the resulting mixture into the desired shape. Excess water or other solvent is then evaporated leaving a hard, dry, shaped body. The same procedure can be followed with other binders, for example, powdered resins. In such cases, however, a suitable organic solvent such as toluene or benzene would be used.

After the device is shaped and dried, it is preferably covered entirely with a thin plastic film to protect it from penetration by electrolyte or other liquid materials in the cell. The film used should be permeable to hydrogen gas but impermeable to liquids. The film can be applied by any of the conventional methods of application including dissolving the film material in an organic solvent, spraying the solution on the pellet and evaporating the solvent; dissolving the film material in an inorganic solvent, dipping the pellet into the solution and evaporating the solvent from the surface of the pellet; wrapping the pellet in the film and heat shrinking the film to provide a tightly sealed, wet proof, hydrogen permeable covering; or heat sealing the pellet in an extruded tube of the selected film material. Any hydrogen gas permeable and liquid impermeable film can be used to protect the devices of the present invention. Particularly useful films include polyethylene, copolymers of polyvinyl chloride and polyvinylidene chloride, polystyrene, ethyl cellulose and polyethylene terephthalate. Of these, the polyethylene films in thicknesses of 0.5 to 2.5 mils are preferred, heat shrunk around the pellet since they provide a very tight, strong skin which is highly permeable to hydrogen gas.

The following examples are merely illustrative of the present invention and are not intended, in any way, to be limitative thereof:

EXAMPLE I

Into a ball mill were placed, in the dry state, 160 grams of electrolytic manganese dioxide powder, 1 gram of palladium coated carbon powder (5 per cent palladium on carbon), 2 grams of acetylene black, 80 grams of Portland cement, and 5 grams of steel wool chopped to ⅛ inch lengths. These components were mixed thoroughly in the ball mill for about 30 minutes. At the end of this time 16 grams of the dry mixture were placed in a beaker to which a few drops of 9 molar potassium hydroxide and, subsequently, 7 milliliters of distilled water were added to make a spreadable paste. After being well blended, the paste was filled into half-moon shaped channels 1½ inch in length and three-sixteenths inch in diameter cut in a Lucite block. The paste-filled block was oven-dried at 45°–65°C. for 40 minutes and the pellets were removed from the block and further dried in air overnight at room temperature. The average weight of each pellet was 1.3 grams of which 0.85 gram was manganese dioxide. The formed pellets were wrapped in a layer of heat shrinkable polyethylene film about 1 to 2 mils thick. The film was then heat shrunk around the pellet and the edges of the film were heat sealed using a hot air blower set at 130°C.

These pellets could absorb up to 220 cubic centimeters of hydrogen gas at standard temperature and pressure and, when placed inside the current collector of rechargeable D-size alkaline manganese dioxide cells, in the manner shown in FIG. 1, substantially improved the high temperature storage capacity of the cells such that no cell rupture occured after 14 weeks storage at 71°C. Fifty per cent of control cells containing no hydrogen absorbing pellet ruptured after similar storage.

EXAMPLE II

To determine the effects of variation in the level of catalyst content, various hydrogen absorbent compositions were prepared following the basic formula set forth in the following table:

TABLE I

Formula A

| Component | Weight (g) | Percentage |
|---|---|---|
| Electrolytic manganese dioxide powder | 160 | 64.5 |
| Acetylene black | 2 | 0.8 |
| Portland cement | 80 | 32.3 |
| Steel Wool | 5 | 2.0 |
| 5 per cent palladium catalyzed carbon | 1 | 0.4 |

The amount of palladium catalyst in Formula A was varied to yield Formulas B, C, D, E, and F containing 2.0, 5.0, 10.0, 25.0, and 50.0 grams, respectively, of 5 per cent palladium catalyst carbon. The amount of hydrogen absorbed and the absorption rate of each formula are set forth in Table 2.

TABLE 2

Effect of Catalyst Content on Hydrogen Absorption Rate at 45°C.

| Formula | Catalyst Content (%) | Sample Weight (g) | H₂ absorbed in first 30 minutes (cc) | H₂ absorbed in 2 hrs. (cc) | Absorption rate after 1 hour (cc/hr.) |
|---|---|---|---|---|---|
| A | 0.4 | 1.53 | 2.0 | 4.8 | 1.5 |
| B | 0.8 | 1.51 | 3.5 | 9.8 | 4.5 |
| C | 2.0 | 1.47 | 10.5 | 23.6 | 7.0 |
| D | 4.0 | 1.45 | 15.0 | 32.6 | 11.0 |
| E | 9.2 | 1.35 | 27.5 | 48.0 | 11.0 |
| F | 16.8 | 1.38 | 32.0 | 54.5 | 13.5 |

From Table 2 it can be seen that hydrogen absorbing pellets in accordance with the present invention can be prepared having various hydrogen absorption rates and can be tailor-made for specific uses where high absorption rates might be required merely by increasing the amount of catalyst contained in the pellet.

EXAMPLE III

Pellets formed from a mixture of 16 grams of electrolytic manganese dioxide, 0.1 gram of palladium-catalyzed carbon, 0.2 gram acetylene black, 0.8 milliliters of 9 molar potassium hydroxide and 1.43 grams of polyethylene binder in the form of a toluene slurry were molded at 100°C. under 3000 lb. per sq. in. pressure to yield pellets five-eighths inch in length and three-sixteenths inch in diameter and each containing 0.645 gram of manganese dioxide.

These pellets were effective in absorbing hydrogen gas but did not absorb the gas as fast as pellets of the same composition but having a cement binder in the place of the polyethylene binder.

EXAMPLE IV

It has been common practice to include about 8 per cent of mercury based on the weight of the zinc powder to amalgamate the zinc powder of alkaline zinc-manganese dioxide cells to reduce hydrogen gas evolution. The brass collector becomes amalgamated upon contact with the anode. To determine the effect of including the hydrogen absorbing device of the present invention in cells containing reduced amounts of mercury, several tightly sealed C-size cells were prepared containing different amounts of said mercury with and without hydrogen absorbing pellets in the cathode collector. The cells were completed except for the outer finishing components, i.e. metal jacket and outer top and bottom covers. These cells were stored at 45°C. for 150 days. At the end of this time, the "bottom bulge" of the cells, that is, the mechanical deflection of the flat end of the steel can, shown at the top of FIG. 1, was measured as an indication of the amount of unabsorbed hydrogen gas present in the cell. The measurement of the bulge of the bottom of the cell gives a good indication of the amount of gas present in the cell since the flat bottom of the cell is relatively easily deflected and is the first portion of the cell to yield to gas pressure. The results of this test are tabulated in Table 3.

TABLE 3

Bottom Bulge of Cells with Varying Amounts of Mercury

| Composition | Bottom Bulge (inch) |
| --- | --- |
| 2% mercury (no pellet) | 0.023 (ruptured) |
| 2% mercury (with pellet) | 0.013 |
| 4% mercury (no pellet) | 0.023 (ruptured) |
| 4% mercury (with pellet) | 0.011 |
| 8% mercury (no pellet) | 0.018 |
| 8% mercury (with pellet) | 0.011 |

From Table 3 it can be seen that the cells containing hydrogen absorbing pellets in accordance with the present invention had considerably less bottom bulge at the end of the 150 days storage period and none of the cells containing hydrogen absorbing pellets ruptured during the test. It can also be seen that cells with 2% mercury containing a pellet were better than those with 8% mercury and no pellet. This reduction in mercury content represents a substantial saving in the cost of producing the cells since mercury is one of the most expensive ingredients used in the alkaline zinc-manganese dioxide cell system.

While the use of the hydrogen gas absorbing device of the present invention has been described specifically for use in battery systems, it will be obvious to those skilled in the art that the device has utility wherever hydrogen gas absorption is desired. Examples of such applications are liquid level switches, underwater mines and sealed capacitors where hydrogen gas buildup is undesirable and has been a cause of system malfunction. Moreover, while the present invention has been described with reference to many particular details thereof, it is not intended that these details shall be construed as limiting the scope of this invention.

What is claimed is:

1. In a hermetically sealed electrochemical cell having a central, hollow current collector, a zinc anode, a manganese dioxide cathode, and an aqueous potassium hydroxide solution as electrolyte, the improvement which comprises a hydrogen absorbing pellet positioned within said hollow current collector in contact with said electrolyte, said pellet comprising a solid compound which will react chemically with hydrogen gas, a catalyst for the hydrogen gas consuming reaction, a binder for retaining the solid compound and catalyst in a discrete, self-supporting shaped body which will be porous to hydrogen gas so as to allow hydrogen gas to circulate through said body and contact the surfaces of the solid compound and catalyst, and an outer sheath encasing said body which is permeable to hydrogen gas but impermeable to the electrolyte of the cell.

2. In a sealed battery containing at least one electrochemical cell having a metal anode, a cathode depolarizer and an electrolyte, and said cell being susceptible to evolving hydrogen gas which if permitted to buildup could affect the performance of the battery, the improvement which comprises a hydrogen gas absorbing device positioned within said battery, said hydrogen absorbing device consisting essentially of a solid compound which will react chemically with hydrogen gas, a catalyst for the hydrogen gas consuming reaction, a binder for retaining the solid compound and catalyst in a discrete, self-supporting shaped body which will be porous to hydrogen gas so as to allow the hydrogen gas to circulate through the body and contact the surfaces of the solid compound and catalyst and an outer sheath encasing said hydrogen consuming body which is permeable to hydrogen gas but impermeable to the electrolyte of the cell.

3. The battery of claim 2 wherein said solid compound of the hydrogen consuming device is a metal oxide, wherein said catalyst is a noble metal, wherein said binder is an inorganic cement and wherein said outer sheath is a sheet of polyethylene film.

* * * * *